Patented July 5, 1949

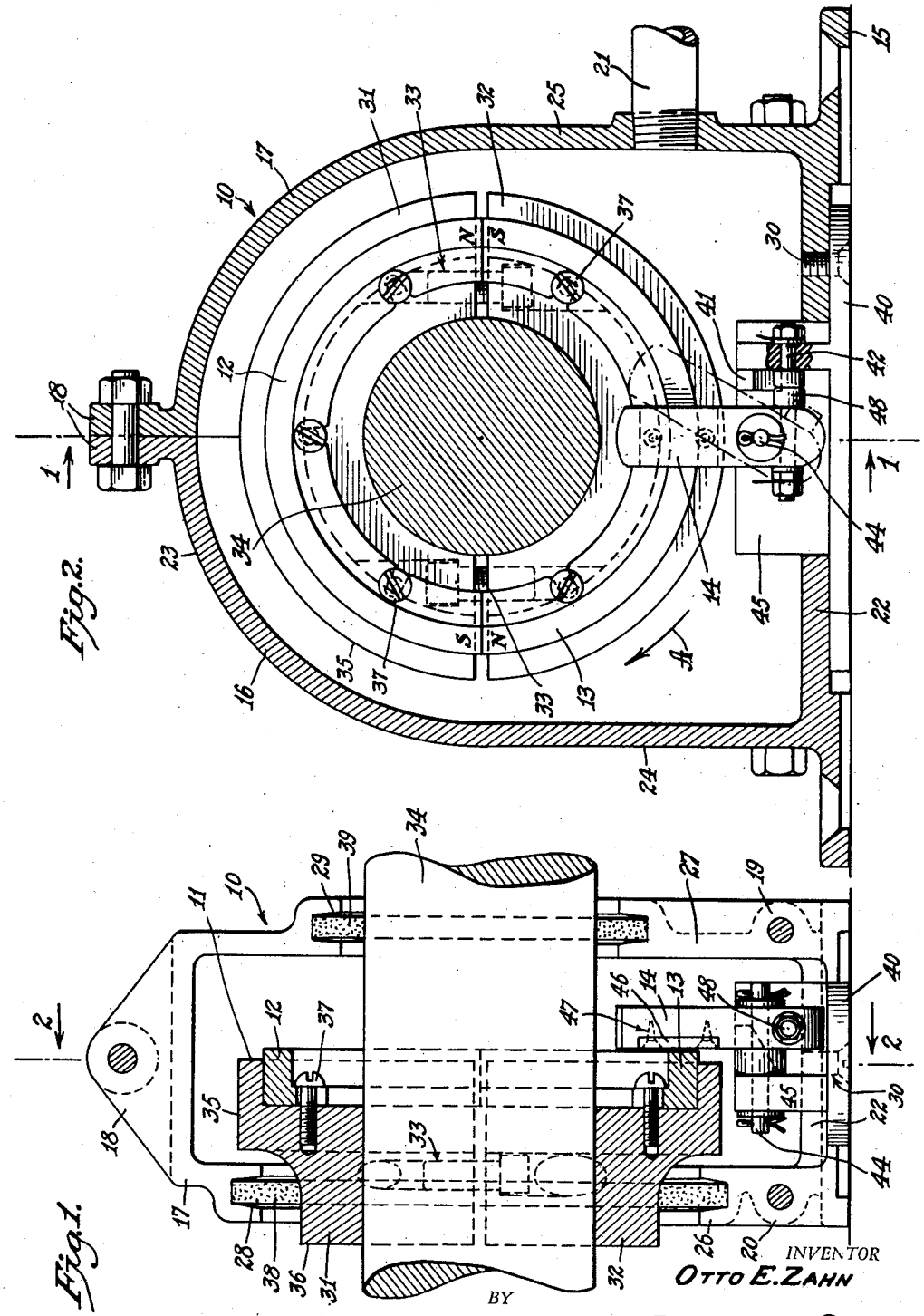

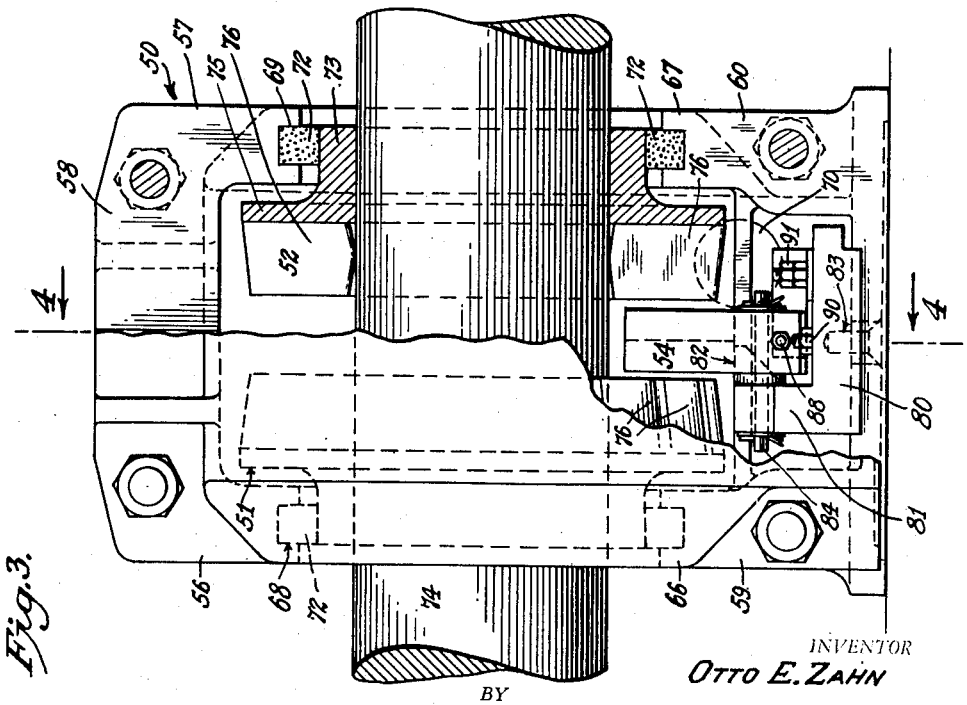
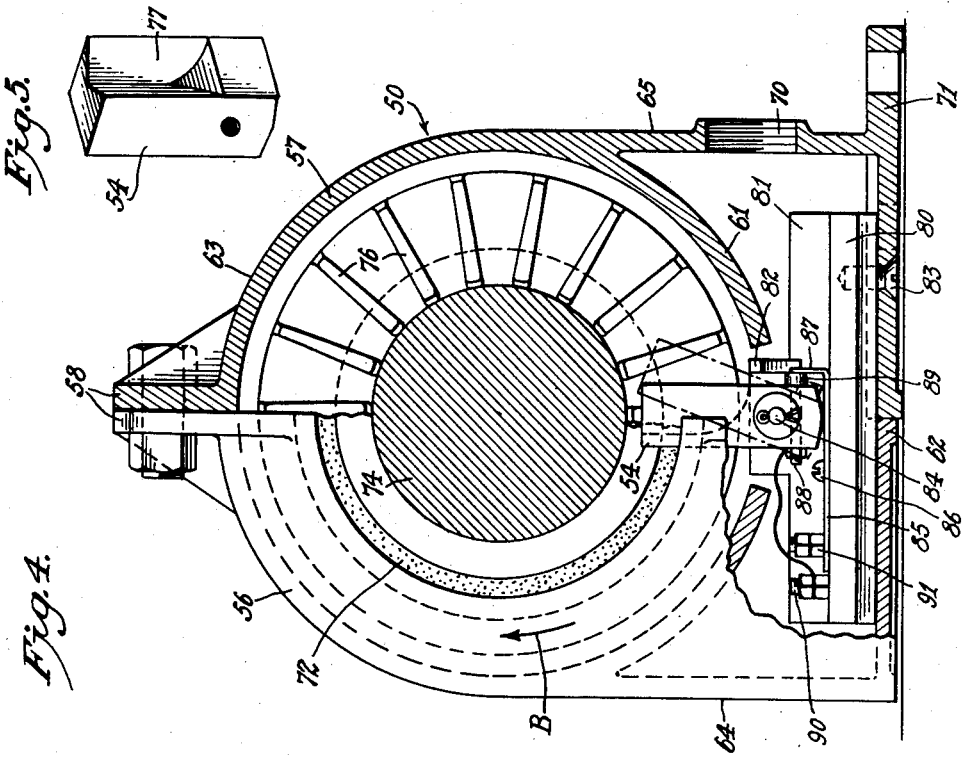

2,475,169

UNITED STATES PATENT OFFICE 2,475,169

MOTOR CONTROL

Otto E. Zahn, Mishawaka, Ind., assignor to American Wheelabrator & Equipment Corporation, a corporation of Delaware Application February 29, 1944, Serial No. 524,349

11 Claims. (Cl. 200—52)

This invention relates to motor control systems and more particularly to apparatus for electrically braking motors quickly to bring them to a standstill.

In order to bring electric motors quickly to a standstill, it has been the custom to brake the motors electrically by reversing the current, or by some other change in the electric circuit. In cases where the motor drives a processing machine at high speed and the load has large momentum, it is particularly desirable to have a braking system and to bring the machine quickly to a standstill because otherwise the motor and load would coast for a long period, preventing access to the work and slowing up production.

In devices of this kind the motor is often controlled by two pushbuttons, one a forward button and the other a reverse or "plugging" button. The forward button operates a forward relay having special locking devices which holds the circuit closed until the reverse button is pressed. The reverse button opens the forward relay and closes a reversing relay which applies reversing current to the motor. To insure the motor stopping when its speed is brought to zero, it is common practice to use a special apparatus, sometimes called a "plugging relay," to be driven by the motor shaft. This relay has contacts which break the instant the motor starts to reverse, thus breaking the circuit of the reversing relay and removing all power from the motor.

According to a preferred form of the invention, the plugging relay comprises a specially shaped casing in which is mounted a rotor having two semi-circular permanent magnets, with north and south poles of the respective magnets adjoining. Mounted upon a suitable base in the casing is a finger having a soft iron armature. The rotation of the rotor applies a force to the armature tending to drag it in the direction of rotation. Suitable electrical contacts are arranged so as to close with forward rotation of the rotor and open the instant the rotor starts to reverse. Both rotor and casing are diametrically split so that the entire relay may be applied around a shaft without removing it from its bearings.

The invention also contemplates the use of an air-operated plugging relay. Such a relay may comprise a casing and a pair of impellers having radial blades mounted within the casing. The casing has a support on which is supported a finger or vane which is disposed between the two impellers in such manner as to be acted upon by the air currents set up by the impellers. The air currents drag the vane in the direction of rotation. The vane may be specially shaped so that upon the direction of impeller rotation being reversed, the vane will immediately follow to open the circuit. The impellers and casing may be split diametrically to facilitate applying the entire relay around the shaft without removing it from its bearings, the same as in the magnetic type.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which Fig. 1 represents a cross section through the magnetic type plugging relay taken on the line 1—1 of Fig. 2.

Fig. 2 is a section of the magnetic type taken on the line 2—2 of Fig. 1;

Fig. 3 is an elevation partly in section of the air type plugging relay;

Fig. 4 is a section on the line 4—4 of Fig. 3; and

Fig. 5 is a perspective of the contact finger of the air type relay.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, and more particularly to Figs. 1 and 2, the magnetic type plugging relay comprises in general a casing 10, a rotor 11 supporting permanent magnets 12, 13 and a contact finger 14. The contact finger is moved one way or the other depending upon the direction of rotation of the rotor as explained more in detail hereinafter.

The case 10 may be made conveniently of cast iron and comprises two halves 16, 17 suitably bolted together by bolts extending through top flanges 18 and bottom flanges 19, 20. The casing thus formed has a bottom wall 22, a curved top wall 23 merging into a flat front wall 24 and a flat back wall 25. The casing has side walls 26, 27. The back wall 25 has an opening for connection to a suitable conduit 21 for wires (not shown) to connect the plugging relay contacts in circuit.

The casing is mounted on a suitable support (not shown) by suitable bolts passing through hold-down flanges 15. The side walls 26 and 27 are provided with annular recesses 28, 29 for the reception of packing rings 38, 39 for sealing purposes.

The rotor 11 comprises two halves 31, 32 clamped to a shaft 34 by bolts 33. The core thus formed comprises a hub 36 and a rim 35 to which the semi-circular permanent magnets 12, 13 are connected by screws 37. The packing ring 38 bears against the hub 36 and the packing ring 39 bears against shaft 34 to tightly seal the inside of the case from dust and dirt. The meeting faces of the core halves 31, 32 will be suitably sealed as by disposing soft material therebetween.

The rotor 11 is preferably made of some suitable non-magnetic material, either plastic or metal, while the magnets 12 and 13 are fully energized permanent magnets having their north and south poles adjoining, as indicated by the letters N and S in Fig. 2.

The contact finger 14 is mounted upon a suitable contact base 40 made of suitable insulating material and suitably bolted to the bottom wall 22 by a screw 30 to seal the opening in the bottom wall. The base 40, which is made of suitable insulating material, has an abutment 41 which carries a contact screw 42. The contact finger is pivoted upon the flange 45 by pivot 44. The finger 14 carries a contact bolt 48 adapted to make and break the circuit with stationary contact bolt 42. Suitable wires connect the bolts 48, 42 in circuit. It will be understood that, if desired, the contact construction shown in Figs. 3 and 4 may be used here in place of the one just described.

The contact finger 14 may be made of suitable insulating material and carries imbedded therein a soft iron insert 46 which may be also held by screws 47. The soft iron insert 46 is maintained in very close relationship to the rotary magnets 12, 13 by suitable washers on the pivot pin 44.

When the machine with which the plugging relay is used is running in its forward or operating direction, the shaft 34 which may be the main operating shaft of the machine, is rotating in the direction of the arrow A in Fig. 2. The magnetic drag exerted by the magnets 12, 13 on the soft iron insert 46 holds the contacts 42, 48 closed. As soon as the shaft 34 starts to reverse (after being brought to rest by the electrical reversing operation described above), the magnetic drag will operate to break contacts 42, 48 and open the circuit to bring the entire motor circuit into condition of inoperativeness.

Referring now to Figs. 3 to 5, the air type plugging relay comprises in general a casing 50, rotors 51, 52 and a finger 54. The air drag caused by rotation of rotors 51, 52 applies a force on finger 54 to control the plugging relay circuit in a manner described more in detail below.

The case 50 comprises halves 56, 57 suitably bolted together through top flanges 58 and bottom flanges 59, 60. The casing thus formed comprises a bottom wall 62, a curved top wall 63 merging into curved lower walls 61 to complete a circular air path for the rotors. The casing also comprises a flat front wall 64 and a flat back wall 65. The back wall 65 may have an opening 70 to receive a pipe through which the wires may run to the electrical contacts as described below.

The casing 50 also has side walls 66 and 67 having annular recesses 68 and 69 to receive packing rings 72 to seal the inside of the casing against dust and dirt. The casing 50 is mounted on a suitable support (not shown) by bolts passing through suitable hold-down flanges 71. These flanges are mounted only on the half 57, the other half 56 being unsupported except by its meeting flanges 58, 59, 60.

The rotors 51 and 52 may be substantially identical and may comprise impellers having hubs 73 tightly fitting the shaft 74. The hubs 73 have radial flanges 75 to which radial impeller blades 76 are connected. The packing rings 72 bear against the hubs 73 for sealing purposes.

The contact finger 54 is pivotally mounted upon a contact base 80 made of suitable insulating material and secured to the bottom wall 62 by a screw 83. The contact base 80 has a vertical wall 81 supporting a lug 82. A pivot bolt 84 passes through the contact finger 54 and through the vertical wall 81 to suitably position the finger 54 between the two impellers 51, 52.

Mounted upon the contact base is a contact plate 85 suitably secured by screws 86 and having a contact flange 87 adapted to make contact with a contact bolt 88 passing through the contact finger and having a head 89. A binding post 90 passes through insulating base 80 and has a flexible pigtail connection with contact bolt 88. A second binding post 91 passes through contact plate 85. It will be understood that suitable electrical wires (not shown) connect the binding posts 90 and 91 and pass out through a suitable conduit threaded into the hole 70 in the casing to control the plugging relay circuit by the make and break of contacts 87, 89 in the manner described above.

When the machine with which the plugging relay is used is moving in its forward or operating direction, the shaft 74 is rotating in the direction indicated by the arrow B in Fig. 4. The air drag caused by rotating blades 76 in the confined casing formed by walls 63 and 61 upon the finger 54 causes the contacts 87, 89 to engage. The finger 54 may be provided with a recess 77 facing opposite the direction of forward impeller movement to increase the effectiveness of the force exerted upon the finger by the rotating impellers. As soon as the shaft 74 begins to reverse, after being brought to rest by the electrical forces described above, the contact fingers 54 will be instantly moved in a direction of impeller rotation to open contacts 87, 89 and thereupon render the entire motor circuit inoperative.

The invention also provides a novel plugging relay which is simple and rugged in construction, can be economically built and easily connected and adjusted. The plugging relay also can be readily connected in either direction of rotation of the shaft by a simple change in connections and without other adjustments.

Thus plugging relays have been described which are simple and efficient in operation. In both types the rotating field of influence provides the necessary drag or force upon the contact finger without the use of mechanical friction or liquid mediums. Thus there is nothing to wear and no troublesome liquid to be handled. The air and magnetic forces operate reliably without change for long periods of time. The casing and shaft seals prevent fine metallic particles or dust from getting into the vital parts. A further advantage of the magnetic type is that both casing and rotor are made in halves so that the relay may be applied to a shaft between bearings without requiring the shaft to be removed from its bearings. A further advantage is the adaptability to shafts regardless of the direction of forward rotation. It will be seen that either the magnetic type or the air type may be applied for operation with shafts having either direction of forward rotation.

While certain novel features of the invention have been disclosed herein, and are pointed out in the annexed claims, it will be understood that various ommissions, substitutions and changes may be made by those skilled in the art without departing from the spirit of the invention.

What is claimed is:

1. In a plugging relay for stopping an electric motor, a casing adapted to be disposed around a rotary shaft driven by said motor, a rotor adapted to be secured to said shaft, said rotor comprising a core, a plurality of arcuate permanent magnets connected to said core with opposite poles adjoining, sealing devices between said casing and shaft, a contact element comprising a soft iron armature in close relationship to said rotary magnets, and contacts operated by said element adapted to be made and broken depending upon the direction of rotation of said rotor, said rotor, contact element and contacts all located within said casing and protected by said sealing devices, said contacts having one position with normal rotation of said rotor and moving to another position upon incipient reversal of rotation of said rotor.

2. In an electric switch, a casing comprising halves adapted to be bolted together around a rotary shaft, a rotor comprising halves adapted to be bolted to said shaft, said rotor comprising a hub portion and a rim portion, two semi-circular permanent magnets one attached to the rim portion of each rotor half, said magnets being coextensive with their respective rotor halves and being disposed with the opposite poles adjoining, said casing having annular recesses, packing rings in said recesses and bearing against said hub and said shaft, a contact block secured to the bottom wall of said casing, a contact finger pivoted to said block, a soft iron armature secured to said contact finger in close relationship to said rotary magnets, and contacts operated by said finger adapted to be made and broken depending upon the direction of rotation of said rotor.

3. In an electric contact device, a casing comprising halves adapted to be bolted together around a rotary shaft, a rotor comprising halves adapted to be bolted to said shaft, said rotor comprising a hub portion and a rim portion, two semi-circular permanent magnets one attached to each rotor half and disposed within said rim portions, each magnet comprising a rim portion having an inwardly projecting flange, screws passing through said flanges into the rotor, said magnets being coextensive with their respective rotor halves and being disposed with the opposite poles adjoining, said casing having annular recesses, packing rings in said recesses and bearing against said hub and said shaft, a contact block secured to the bottom wall of said casing, a contact finger pivoted to said block, a soft iron armature secured to said contact finger in close relationship to said rotary magnets, and contacts carried by said finger and by said contact base adapted to be made and broken depending upon the direction of rotation of said rotor.

4. In an electric switch, a casing comprising halves adapted to surround a rotating shaft and to be bolted together, said casing having a cylindrical airway formed by a circular top wall and circular bottom walls, spaced impellers on said shaft, each impeller comprising a hub secured to the shaft and impeller blades, the blades of each impeller facing the other, said impeller being spaced apart to form an operating space, sealing devices between said casing and shaft, a contact finger pivoted to said casing and disposed in said operating space, and contact devices actuated by said finger under direction of rotation of said impeller.

5. In an electric switch, a casing comprising halves adapted to surround a rotating shaft and to be bolted together, said casing having a cylindrical airway formed by a circular top wall and circular bottom wall, spaced impellers on said shaft, each impeller comprising a hub secured to the shaft and impeller blades, the blades of each impeller facing the other, said impeller being spaced apart to form an operating space, said casing having annular recesses in their side walls, packing rings in said recesses bearing against said hubs, a contact base on said bottom wall under said airway, a contact finger pivoted to said contact base and disposed in said operating space, and contacts operated by movement of said contact finger.

6. In an electric switch, a casing comprising halves adapted to surround a rotating shaft and to be bolted together, said casing having a cylindrical airway formed by a circular top wall and a circular bottom wall, spaced impellers on said shaft, each impeller comprising a hub secured to the shaft and impeller blades radially disposed with respect to the shaft, the blades of each impeller facing the other, the impellers being spaced apart to form an operating space, said casing having annular recesses in their side walls, packing rings in said recesses bearing against said hubs, a contact base on said bottom wall under said airway, a contact finger pivoted to said contact base and carrying a movable contact, said contact base carrying a stationary contact, said contact finger being disposed in said operating space, said finger having a recess facing opposite to the direction of normal rotation of said impellers.

7. In a plugging relay responsive to incipient reversal of rotation of a motor to be stopped, a casing surrounding a rotary shaft driven by said motor, a rotor within said casing and affixed to said shaft, said rotor carrying means for generating a field of influence rotatable therewith, said rotor being operative in said casing when filled with a gaseous medium, a contact vane or finger of low mass, said vane or finger being responsive to the drag exerted by said field of influence, articular means supporting said finger, contact means requiring little or no force for operation, said contact means being operated by movement of said vane or finger to control a circuit, said vane or finger having its free end in spaced but close relationship to said rotor and in said field of influence whereby forward rotation of said rotor exerts a drag on said finger in one direction and incipient reversal of rotation of said rotor exerts a drag on said finger said finger in the other direction to operate said contact means.

8. In a plugging relay responsive to incipient reversal of rotation of a motor to be stopped, a casing applied to a rotary shaft driven by said motor to surround said shaft, a rotor within said casing and affixed to said shaft, said rotor carrying means for generating a field of influence rotatable therewith, said rotor being operative in said casing when filled with a gaseous medium, an insulating base carried by said casing, said base having a bearing support, a contact vane or finger of low mass, said vane or finger being responsive to the drag exerted by said field of influence, pivot means supporting said finger on said support to freely pivot said finger to permit movement through a small angle while maintaining generally vertical position, an electric contact carried by said finger, a second electric contact carried by said base and having simple frictionless abutting relation with said finger contact to close a control circuit, said pivot means being positioned substantially radially of the rotor and beyond the periphery thereof, said vane or finger having its free end in spaced but close relationship to the periphery of said rotor and in said field of influence.

9. In a plugging relay responsive to incipient reversal of rotation of a motor to be stopped, said relay being adapted to be applied around a shaft driven by said motor, a split casing whose side walls have sealing relation with said shaft, a split rotor within said casing adapted to be affixed to said shaft, said rotor carrying peripheral means for generating a field of influence rotatable therewith, said rotor being operative in said casing when filled with a gaseous medium, an insulating base carried by the floor of said casing, said base having a bearing support, a contact vane or finger of low mass, said vane or finger being responsive to the drag exerted by said field of influence, pivot means supporting said finger on said support to freely pivot said finger to permit movement through a small angle while maintaining generally vertical position, an electric contact carried by said finger, a second electric contact carried by said base and having simple frictionless abutting relation with said finger contact to close a control circuit, said base carrying an additional abutment to limit the movement of said finger to open position, said pivot means being positioned substantially radially of the rotor and beyond the periphery thereof, said vane or finger having its free end in spaced but close relationship to the periphery of said rotor and in said field of influence, whereby forward rotation of said rotor influences said finger to hold said contacts closed and incipient reversal of rotation of said rotor influences said finger to immediately open said contacts.

10. In a plugging relay responsive to incipient reversal of rotation of a shaft, a casing surrounding said shaft, a rotor within said casing and affixed to said shaft, said rotor carrying means for generating a field of influence rotatable therewith, said rotor being operative in said casing when filled with gaseous medium, a contact finger of low mass and responsive to the drag of said field of influence, articular means supporting said contact finger in substantially balanced vertical position, contact means requiring little or no force for operation and operable by movement of said finger to control a circuit, said finger having its free end in spaced but close relationship to said rotor and in said field of influence whereby forward rotation of said rotor exerts a drag on said finger in one direction and incipient reversal of rotation of said rotor immediately exerts a drag on said finger in the other direction to operate said contact means.

11. In a plugging relay responsive to incipient reversal of rotation of a shaft, said device being adapted to be applied around said shaft in contradistinction to being slipped over the end thereof, said device comprising a split casing whose side walls have sealing relation with said shaft, a split rotor within said casing and adapted to be affixed to said shaft, said rotor carrying means for generating a field of influence rotatable therewith, a control member in said casing in spaced but close relationship to said rotor and responsive to the drag exerted by said field of influence, means mounting said control member to make it movable with incipient reversal of rotation of said shaft.

OTTO E. ZAHN.

REFERENCES CITED

The following references are of record in the file of this patent:

UNITED STATES PATENTS

| Number | Name | Date |
|---|---|---|
| 1,161,932 | DuBois | Nov. 30, 1915 |
| 1,869,034 | Whittingham | July 26, 1932 |
| 1,960,790 | Muffley | May 29, 1934 |
| 1,998,822 | Ronci | Apr. 23, 1935 |
| 2,086,800 | Harris | July 30, 1937 |
| 2,215,242 | Jensen | Sept. 17, 1940 |
| 2,215,294 | Morrill | Sept. 17, 1940 |
| 2,220,763 | Hemphill | Nov. 5, 1940 |

FOREIGN PATENTS

| Number | Country | Date |
|---|---|---|
| 133,635 | Switzerland | Aug. 16, 1929 |
| 576,685 | Germany | May 12, 1933 |